(12) United States Patent
Liang et al.

(10) Patent No.: US 8,913,038 B2
(45) Date of Patent: Dec. 16, 2014

(54) ELECTRONIC DEVICE AND ELECTRONIC READER DEVICE WITH A PROXIMITY SENSING BUTTON

(71) Applicants: Wei-Young Liang, New Taipei (TW); Chin-Lung Ho, New Taipei (TW)

(72) Inventors: Wei-Young Liang, New Taipei (TW); Chin-Lung Ho, New Taipei (TW)

(73) Assignees: Hon Hai Precision Industry Co., Ltd., New Taipei (TW); Koobe Inc., New Taipei (TW)

(*) Notice: Subject to any disclaimer, the term of this patent is extended or adjusted under 35 U.S.C. 154(b) by 0 days.

(21) Appl. No.: 13/651,359

(22) Filed: Oct. 12, 2012

(65) Prior Publication Data

US 2013/0038578 A1    Feb. 14, 2013

Related U.S. Application Data

(62) Division of application No. 12/732,213, filed on Mar. 26, 2010.

(30) Foreign Application Priority Data

Jan. 23, 2010    (CN) .......................... 2010 1 0300624

(51) Int. Cl.
*G06F 3/02*      (2006.01)
*G06F 3/0486*   (2013.01)
*G06F 1/16*      (2006.01)
*G06F 3/0354*   (2013.01)
*G06F 3/0488*   (2013.01)
*G06F 3/041*     (2006.01)
*G06F 3/023*     (2006.01)
*G06F 3/042*     (2006.01)

(52) U.S. Cl.
CPC ............ *G06F 3/0486* (2013.01); *G06F 3/0416* (2013.01); *G06F 3/0234* (2013.01); *G06F 3/0421* (2013.01); *G06F 1/1671* (2013.01); *G06F 3/03547* (2013.01); *G06F 3/0488* (2013.01)
USPC ........................................ 345/175; 178/18.06

(58) Field of Classification Search
CPC ... G06F 1/1671; G06F 3/0416; G06F 3/0234; G06F 3/0421
USPC ............................... 345/173, 175; 178/18.06
See application file for complete search history.

(56) References Cited

U.S. PATENT DOCUMENTS 5,374,787 A    12/1994    Miller et al.
5,488,204 A *   1/1996    Mead et al. ................ 178/18.06
5,543,590 A *   8/1996    Gillespie et al. ........... 178/18.06

(Continued)

FOREIGN PATENT DOCUMENTS

CN    100416482 C    9/2008
CN    100489474 C    5/2009

*Primary Examiner* — Michael J Eurice
(74) *Attorney, Agent, or Firm* — Novak Druce Connolly Bove + Quigg LLP

(57) ABSTRACT

An electronic reader device with a physical control disposed on a surface of the device housing. The physical control is operable to initiate a first function. A display disposed on the surface of the housing is operable to show a virtual control that initiates a second function. A sensor detects a drag operation moving the virtual control to a position on a border of the display adjacent to the physical control. A processor associates the second function with the physical control in response to the drag operation and performs the second function upon activation of the physical control.

35 Claims, 18 Drawing Sheets

(56) References Cited

U.S. PATENT DOCUMENTS

| | | | |
|---|---|---|---|
| 5,789,766 A * | 8/1998 | Huang et al. | 257/88 |
| 5,798,716 A * | 8/1998 | Davis | 341/26 |
| 6,118,435 A * | 9/2000 | Fujita et al. | 345/173 |
| 6,181,344 B1 * | 1/2001 | Tarpenning et al. | 715/863 |
| 6,429,857 B1 | 8/2002 | Masters et al. | 345/175 |
| 2003/0025679 A1 * | 2/2003 | Taylor et al. | 345/175 |
| 2005/0007351 A1 | 1/2005 | Fabrick, II | |
| 2005/0063757 A1 * | 3/2005 | Sugimura et al. | 400/472 |
| 2005/0270278 A1 * | 12/2005 | Ouchi | 345/173 |
| 2006/0186359 A1 * | 8/2006 | Suzukawa | 250/551 |
| 2006/0238517 A1 * | 10/2006 | King et al. | 345/173 |
| 2007/0013672 A1 * | 1/2007 | Shim et al. | 345/173 |
| 2007/0152977 A1 * | 7/2007 | Ng et al. | 345/173 |
| 2007/0152983 A1 * | 7/2007 | McKillop et al. | 345/173 |
| 2007/0262963 A1 * | 11/2007 | Xiao-Ping et al. | 345/173 |
| 2007/0268247 A1 * | 11/2007 | Quatro | 345/156 |
| 2008/0006453 A1 * | 1/2008 | Hotelling | 178/18.06 |
| 2008/0047764 A1 * | 2/2008 | Lee et al. | 178/18.06 |
| 2008/0077881 A1 * | 3/2008 | Gilley et al. | 715/810 |
| 2008/0143688 A1 * | 6/2008 | Cho | 345/173 |
| 2008/0158198 A1 * | 7/2008 | Elias | 345/174 |
| 2008/0165140 A1 * | 7/2008 | Christie et al. | 345/173 |

* cited by examiner

ELECTRONIC DEVICE AND ELECTRONIC READER DEVICE WITH A PROXIMITY SENSING BUTTON

CROSS-REFERENCE TO RELATED APPLICATIONS

This application is a divisional of U.S. application Ser. No. 12/732,213, entitled "ELECTRONIC READER DEVICE AND GRAPHICAL USER INTERFACE CONTROL METHOD THEREOF", filed on Mar. 26, 2010, published as US20110181603A1, which is based upon and claims the benefit of priority from Chinese Patent Application No. 201010300624.7, filed on Jan. 23, 2010 in the People's Republic of China. The entirety of each of the above-mentioned patent applications is hereby incorporated by reference herein in its entirety.

BACKGROUND

1. Technical Field

The disclosure relates to computer technologies, and more particularly to an electronic reader device and flexible control interface thereof.

2. Description of Related Art

Digitally formatted books are widely known as e-books. Current e-book reader devices often feature a reflective display, and offer free wireless access to Internet bookstores. One appealing factor of the e-book reader device is the capability of carrying numerous digitally formatted books in a small unit. Being designed for reading, a major surface area of an e-book reader is reserved for a display while physical controls, such as keys or a keyboard, surround the display. Among the physical controls, a functional key activates a specific function, such as returning to a main menu, launching an e-mail application, connecting to a bookstore and others. Although functional keys are designed for convenience of executing certain common tasks, the most frequently executed key can vary by users. An icon or symbol may be printed on a functional key to denote the function corresponding thereto. Since such prints are fixed to the surface of an e-book reader, changing functionality of the key can lead to confusion.

DETAILED DESCRIPTION

Description of exemplary embodiments of the electronic reader device and electronic reader device is given in the following paragraphs which are organized as:
1. System Overview
   1.1 Exemplary Reader Device
   1.2 Structure of a physical control
2. GUI control method
   2.1 Icon behaviors
   2.2 Exemplary operation
3. Alternative embodiments
   3.1 Alternative configuration of touch sensors
   3.2 Additional contact operations
4. Conclusion
1. System Overview The disclosed electronic reader device can be implemented as a standalone device or integrated in various electronic devices, such as a cell phone, a tablet personal computer (PC), a laptop computer, a monitor, a multimedia player, a digital camera, a set top box, a personal digital assistant (PDA), a navigation device or a mobile internet device (MID).

1.1 Exemplary Reader Device

Figure 1:
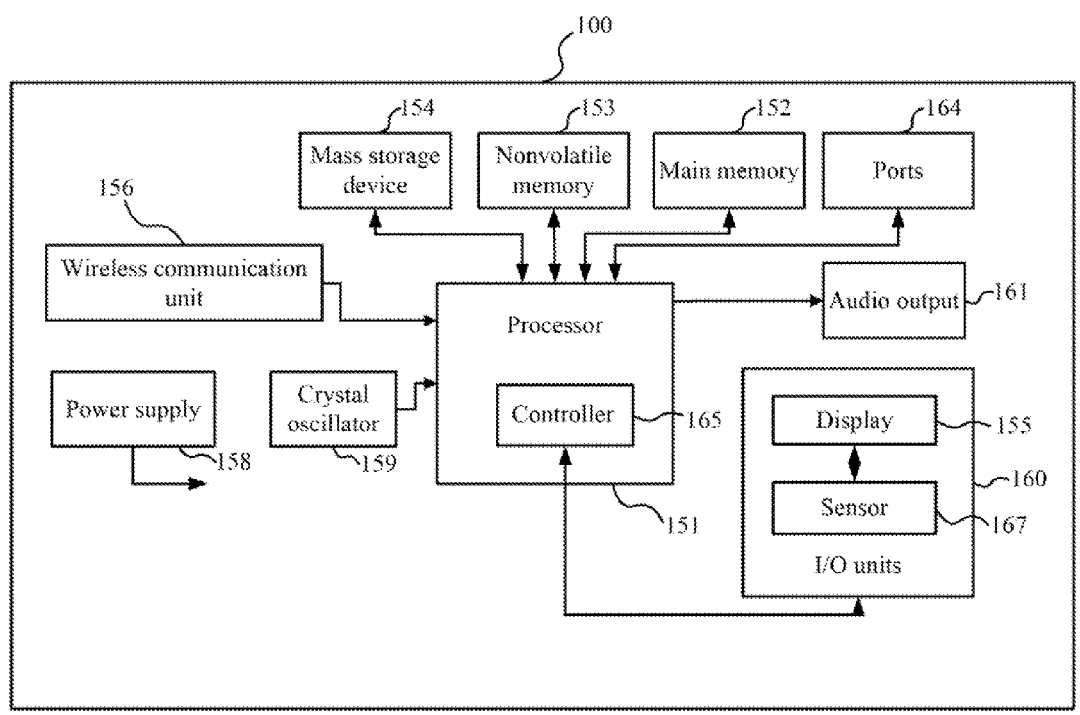
FIG. 1 is a block diagram of an exemplary embodiment of an electronic reader device.

With reference to FIG. 1, a processor 151 comprises a central processing unit of the electronic reader device 100. The processor 151 may comprise various integrated circuits (ICs) for processing data and machine-readable instructions. A communication unit 156 establishes wireless communication channels through which the electronic reader device 100 may connect to and download e-books from a virtual bookstore. The communication unit 156 may comprise antennas, base band and radio frequency (RF) chipsets for wireless local area network communication and/or cellular communication such as wideband code division multiple access (W-CDMA) and high speed downlink packet access (HS-DPA). The processor 151 may be packaged as a chip or comprise a plurality of chips interconnected through buses. For example, the processor 10 may only comprise a central processing unit (CPU) or a combination of a CPU, a digital signal processor (DSP), and a chip of a communication controller, such as a chip of the communication unit 156. The communication controller may comprise a controller of a cellular communication, infrared, BLUETOOTH, or wireless local area network (LAN) communication devices. The communication controller coordinates communication among components of the electronic device 100 or communication between the electronic device 100 and external devices.

A power supply 158 provides electrical power to components of the electronic reader device 100. A crystal oscillator 159 provides clock signals to the processor 151 and other components of the electronic reader device 100. Connection of the components in the electronic reader device 100 is shown in FIG. 1 and may comprise serial or parallel transmission buses. Input and output (I/O) units 160 may comprise control buttons, an alphanumeric keypad, a touch panel, a touch screen, and a plurality of light emitting diodes (LEDs). A controller 165 detects operations on the I/O units 160 and transmits signals indicative of the detected operation to the processor 151. The controller 165 also controls operations of the I/O units 160. The processor 151 may control the I/O units 160 through the controller 165. Ports 164 may be used to connect to various computerized interfaces, such as an external computer, or a peripheral device. The ports 164 may comprise physical ports complying with universal serial bus (USB) and IEEE 1394 standards.

Nonvolatile memory 153 stores an operating system and applications executable by the processor 151. The processor 151 may load runtime processes and data from the nonvolatile memory 153 to the main memory 152 and store digital content in a mass storage device 154. The electronic reader device 100 may obtain digital content such as e-books from the communication unit 156. The main memory 152 may comprise a random access memory (RAM), such as static RAM (SRAM) or dynamic RAM (DRAM). The nonvolatile memory 153 may comprise an electrically erasable programmable read-only memory (EEPROM) or a flash memory, such as a NOR flash or a NAND flash.

An audio output unit comprises a digital to analog converter converting audio signals output by the processor 151 from digital format to analog format.

A display 155 is operable to display text and images, and may comprise a reflective display, such as an electrophoretic display, an electrofluitic display, or a display using interferometric modulation. Alternatively, the display 155 may comprise e-paper, a display made up of organic light emitting diodes (OLEDs), a field emission display (FED), or a liquid crystal display (LCD). The display 155 may display various graphical user interfaces (GUIs) as virtual controls including but not limited to windows, scroll bars, icons, and clipboards. The display 155 may comprise a single display or a plurality of displays in different sizes. The processor 151 may present various GUIs on the display 155 as detailed in the following paragraphs.

The electronic reader device 100 comprises a housing structured to include the components of the electronic reader device 100.

The I/O units 160 comprise a touch sensor 167 operable to detect contact operations on the display 155. The touch sensor 167 may comprise a transparent touch pad overlaid on the display 155 or arrays of optical touch transmitters and receivers located on the boarder of the display 155, such as those disclosed in US patent publication No. 20090189878.

Figure 2:
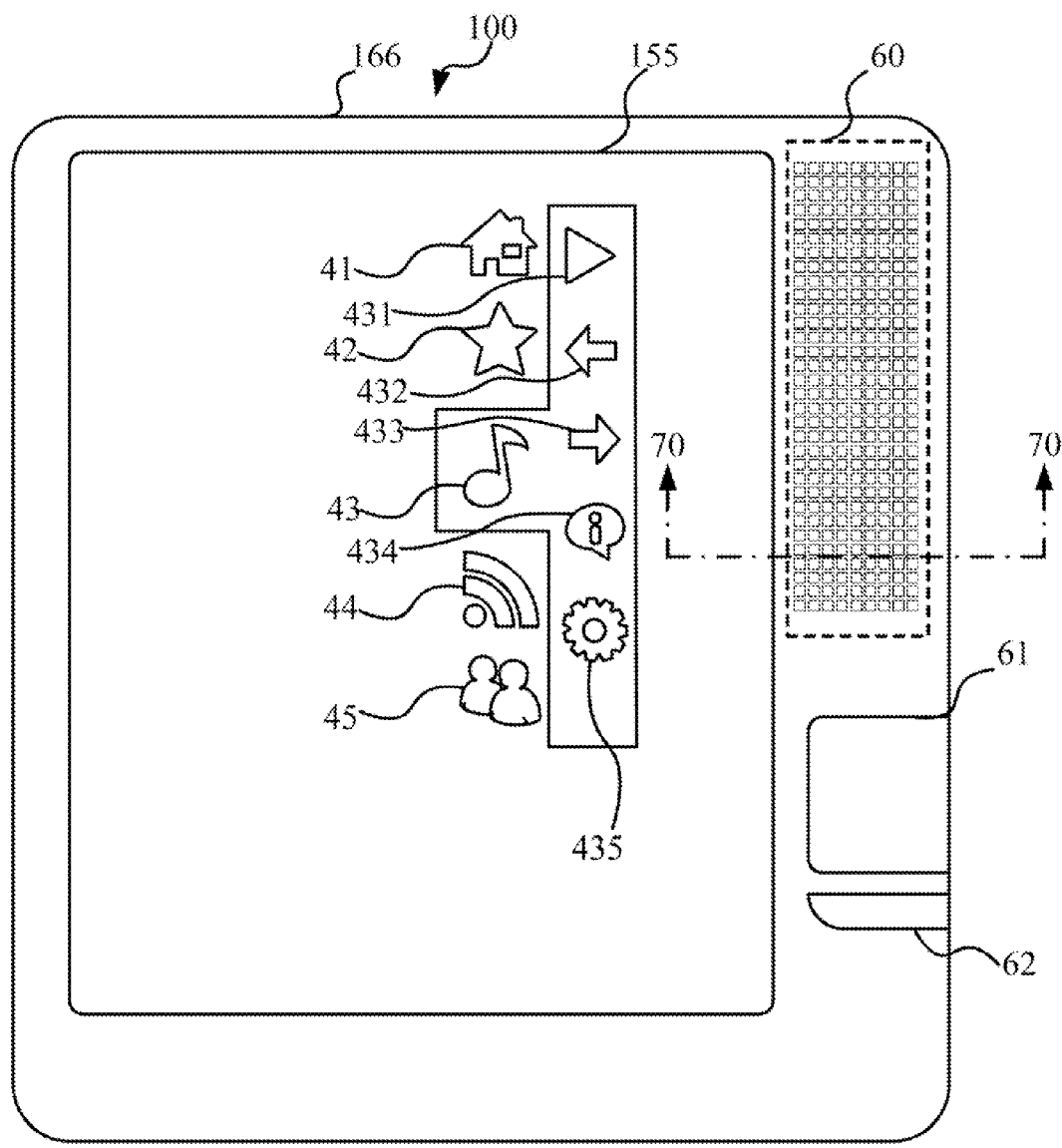
FIG. 2 is a top view of an exemplary embodiment of the electronic reader device.

With reference to FIG. 2, the electronic reader device 100 comprises a shell 166 providing the housing in which the components of the electronic reader device 100 are integrated. Physical controls of the I/O units 160 comprise a control module 60, a touch pad 61, and a key 62, forming a portion of the frame of the display 155. The touch pad 61 is operable to turn pages of an e-book. The key 62 is operable to show a menu on the display 155. The control module 60 comprises activation points, each of which is operable to trigger an operation associated with the activation point upon receiving depression thereon. Each of the activation points may initially associate with a default operation. The display 155, control module 60, a touch pad 61, and a key 62 are disposed on a first surface and form a portion of the shell 166 of the electronic reader device 100.

1.2 Structure of a Physical Control

Figure 3A:
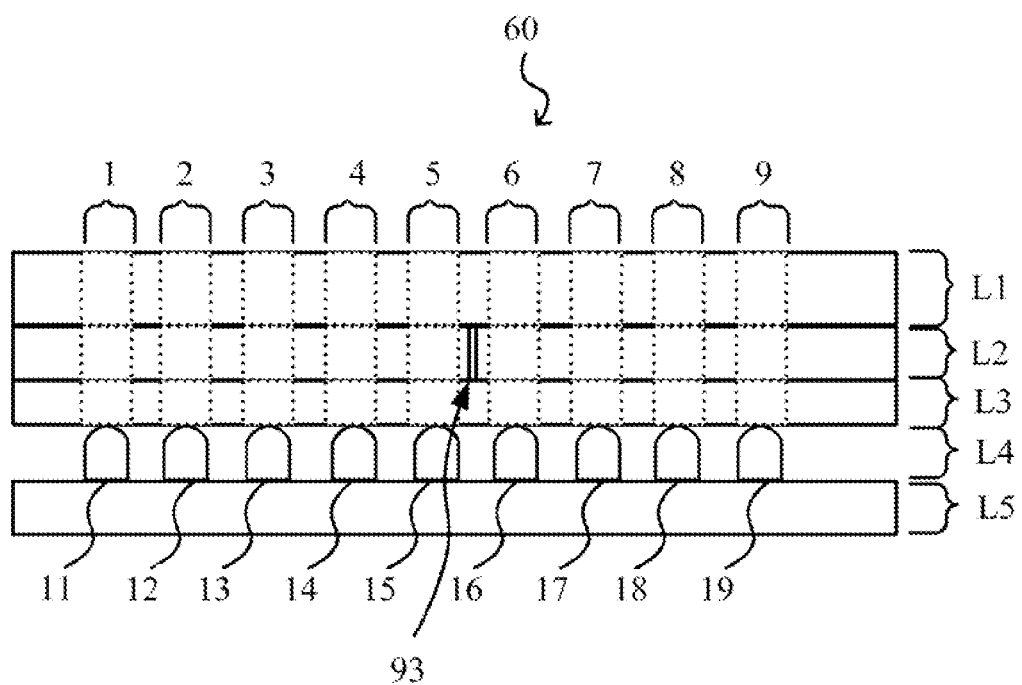
FIG. 3A is a cross-section of an exemplary embodiment of a physical control module.
Figure 3B:
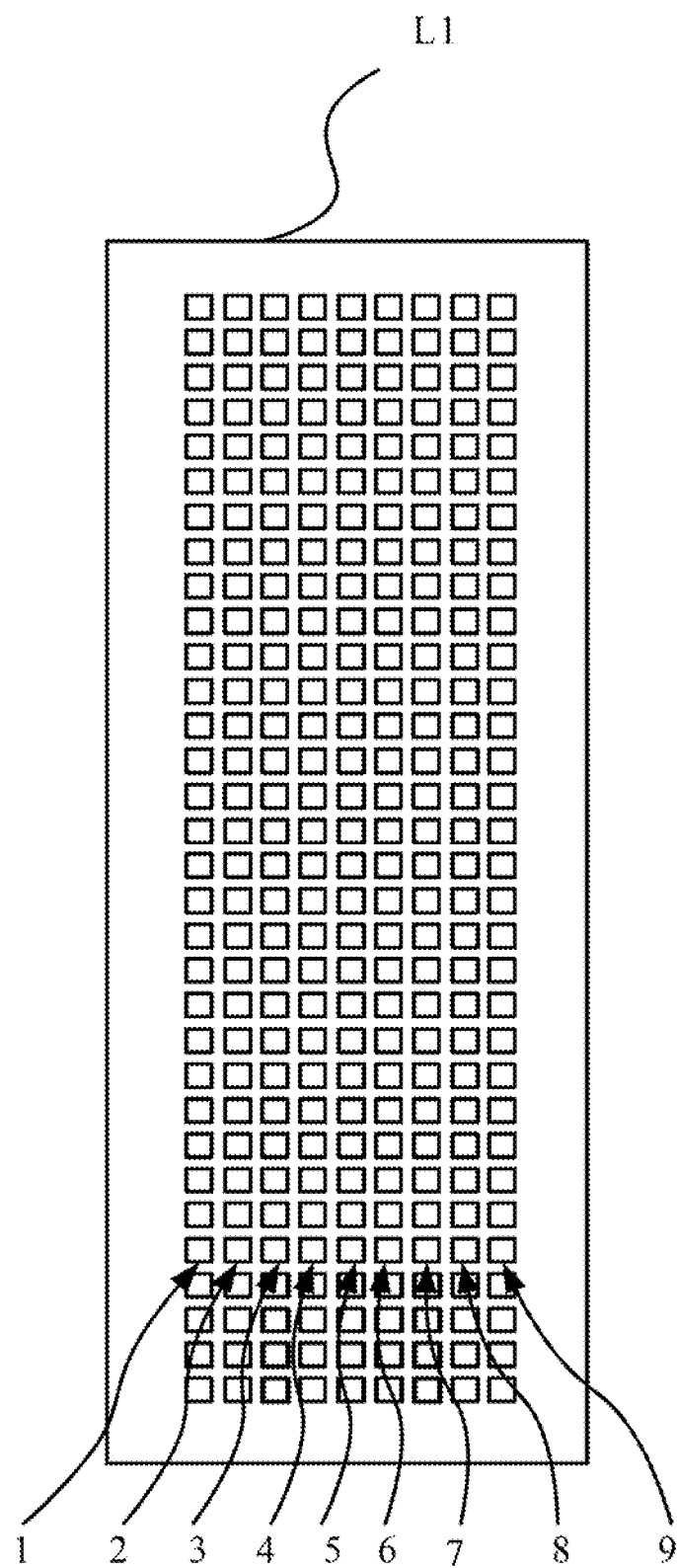
FIGS. 3B-3F are schematic diagrams of respective layers of the exemplary embodiment of the physical control module.

FIG. 3A is a cross-section of the physical control module 60 along a line 70 in FIG. 2. The control module 60 comprises layers L1~L5. With reference to FIGS. 3A and 3B, the layer L1 forms top cover of the control module 60 with an array of transparent windows, among which windows 1~9 are shown in FIG. 3A. Windows in addition to 1~9 are shown as similar squares in FIGS. 3B-3D without labels. Windows on the layer L2 are aligned with windows on the layer L1, windows on the layer L3 are aligned with windows on the layer L2, and are aligned with the lamps on the layer L4. FIG. 3F shows lamps in the layer L4 as similar circles, among which lamps 11-19 are shown in FIG. 3A. The windows on layers L1-L3 may be filled with transparent dielectric materials, such that lamps in the layer L4 may provide light beams through the windows.

Figure 3C:
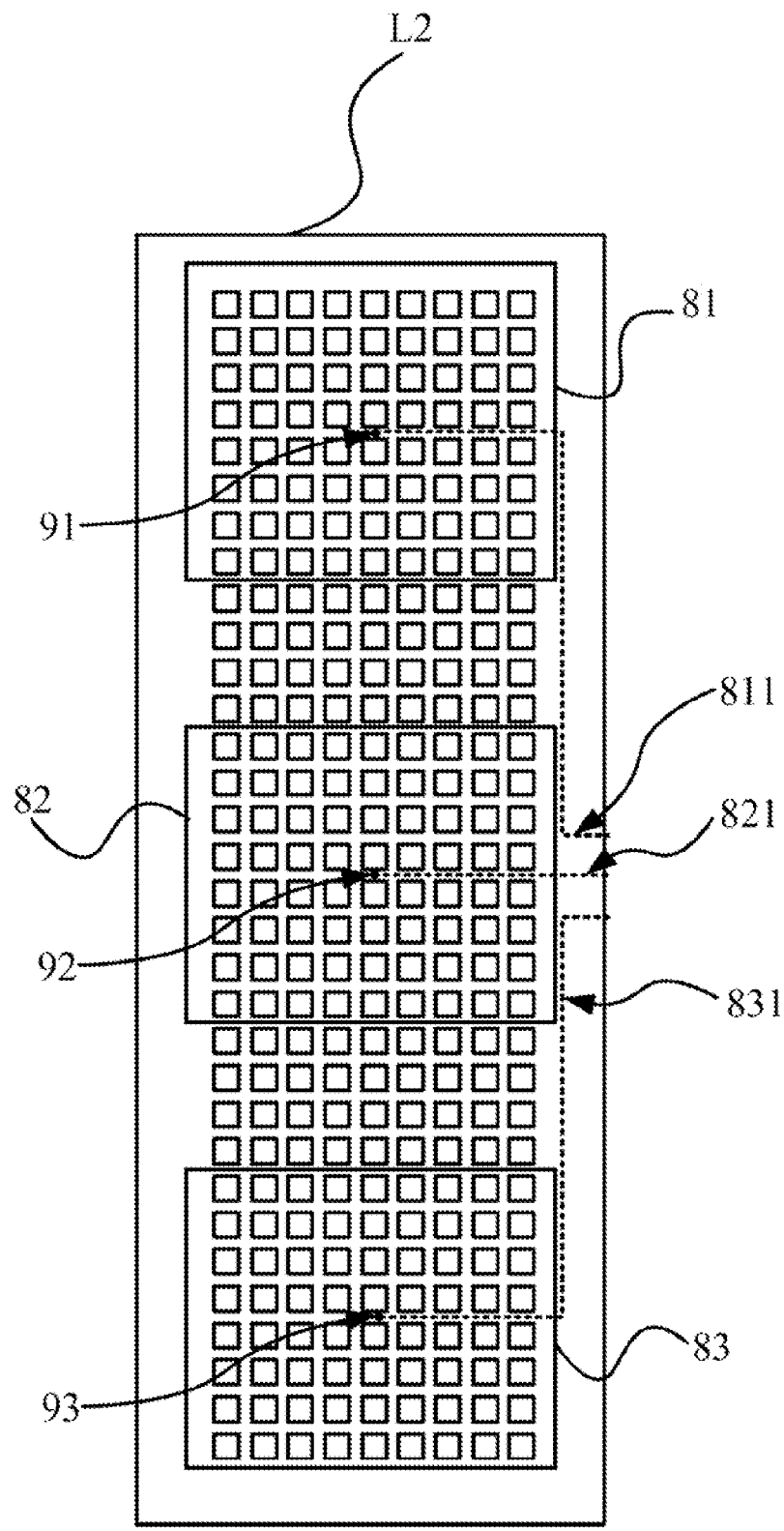

FIG. 3C shows the upper surface of the layer L2. The layer L2 comprises a printed circuit board (PCB) on which three printed metallic areas 81-83 (in FIG. 3C) are formed, each of which acts as a detection pad. Each of the detection pads 81-83 comprises an array of openings to form a plurality of windows thereon. Vias 91, 92, and 93 in the layer L2 represented by round points in FIG. 3C are respectively formed by centers of the detection pads 81-83 and are filled with conductive material such as tin. Buses 811, 821, and 831 connected to the detection pads 81-83 are formed on the lower surface of the layer L2, and thus represented by dotted lines in FIG. 3C.

Figure 3D:
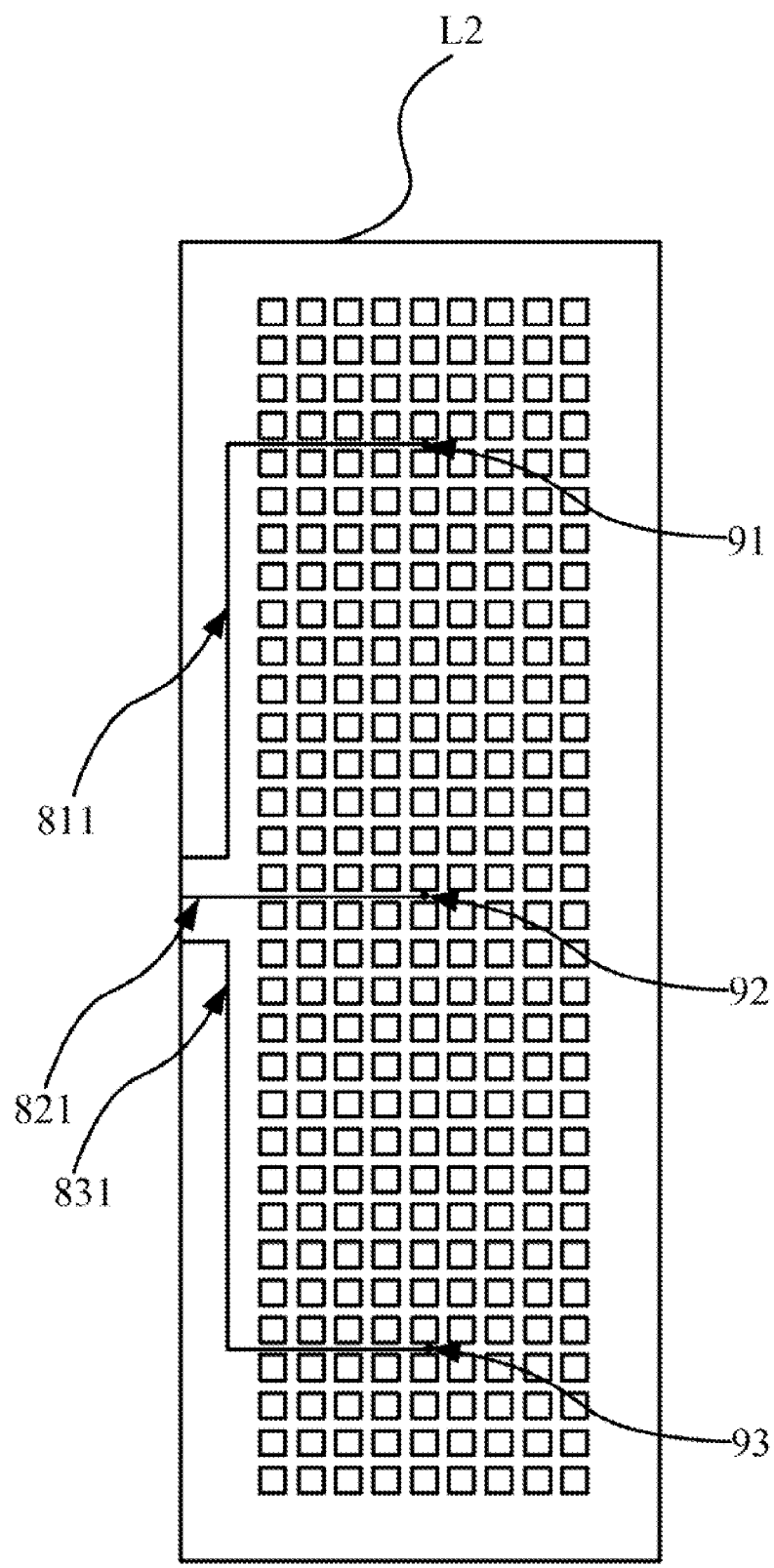
Figure 4:
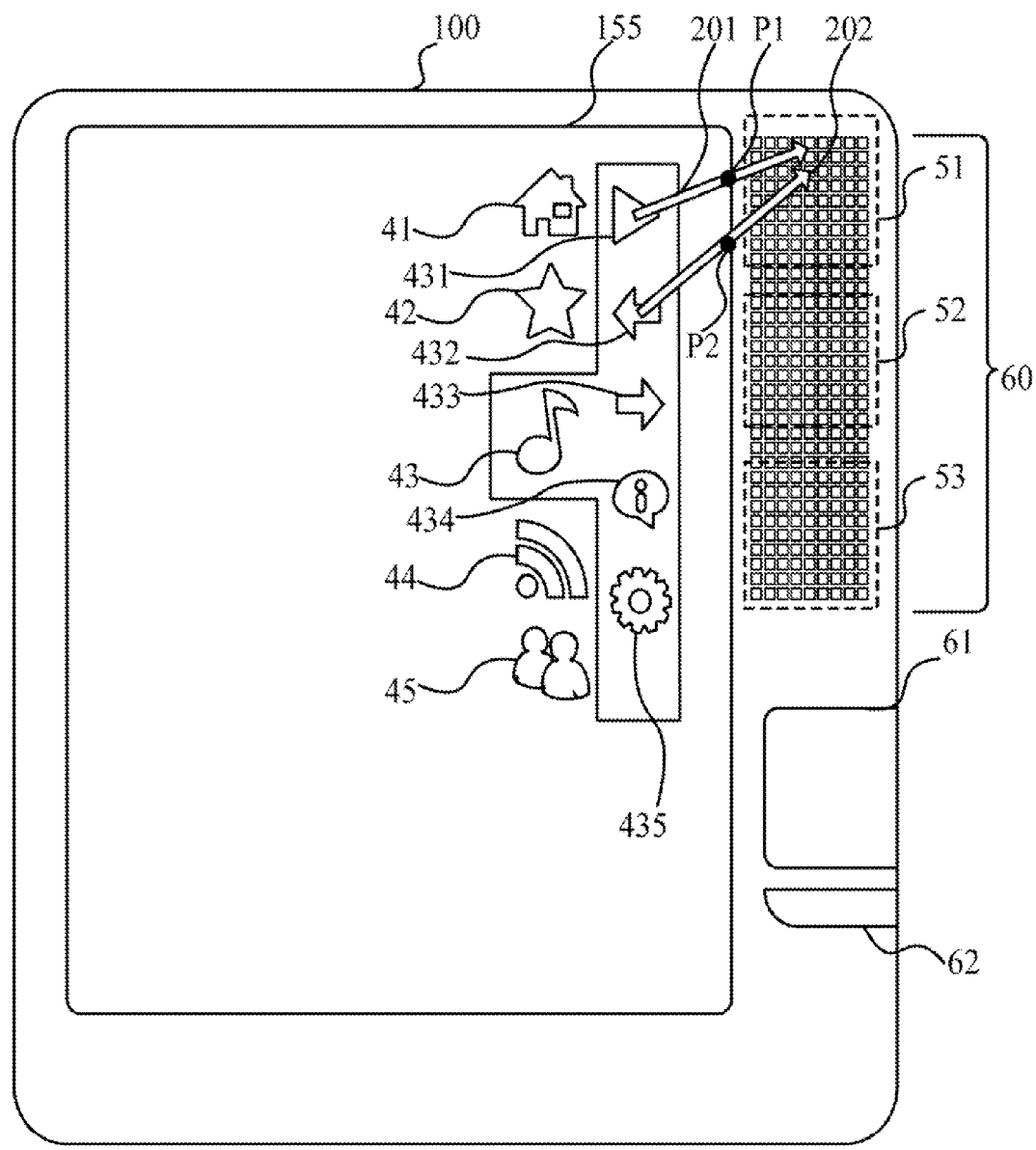
FIG. 4 is a schematic diagram showing exemplary drag operations of icons.

With reference to FIG. 3D, the buses 811, 821, and 831 of the detection pads 81-83 are formed on the lower surface of the layer L2 and connected to the detection pads 81-83 respectively through the vias 91, 92, and 93. Each of the buses 811, 821, and 831 has one end connected to one of the detection pads 81-83 and the other end connected to the controller 165. The controller 165 detects contact operations in close proximity region to an operating point of the control 60 by determining capacitance changes of at least one of the detection pads 81-83. Alternatively, the controller 165 may detect contact operations in close proximity region to an operating point of the control 60 by determining changes in thermal or biological parameters through at least one of the detection pads 81-83. With reference to FIG. 4, areas 51-53 on the control 60 are respectively in close proximity region to the detection pads 81-83. Each of the areas 51-53 serves as an operating point of the control 60 which when activated triggers the electronic reader device 100 to perform one or more functions associated with the operating point. Upon detecting contact, the controller 165 may interpret the contact operation on one operating point as activation operation of the operating point. As each of the areas 51-53 may initially be associated with no function, lamps in the areas 51-53 may correspondingly be initially off and showing any iconic image.

Figure 3E:
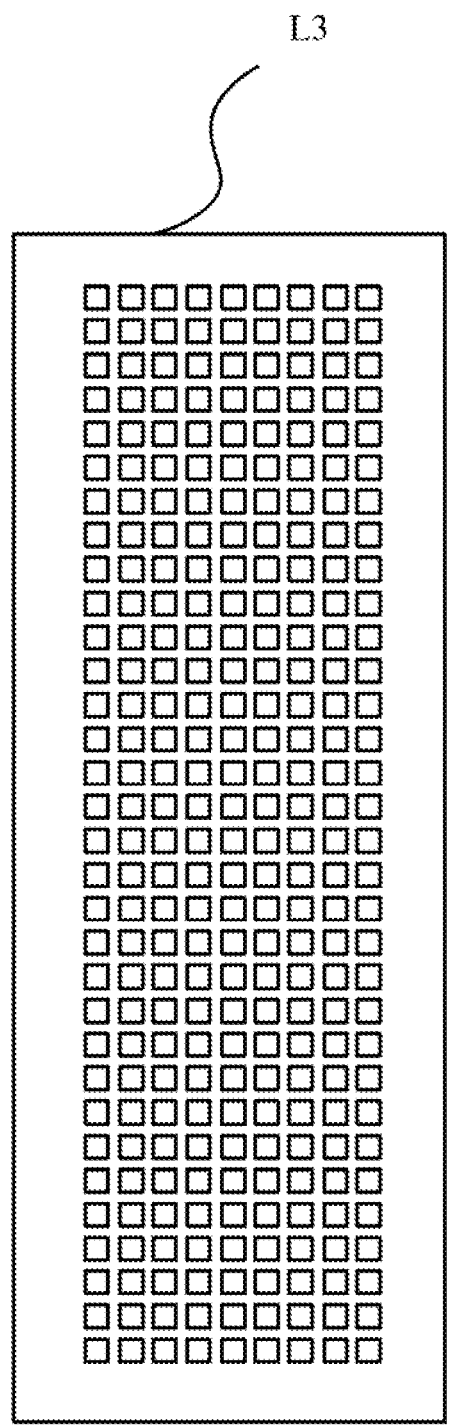
Figure 3F:
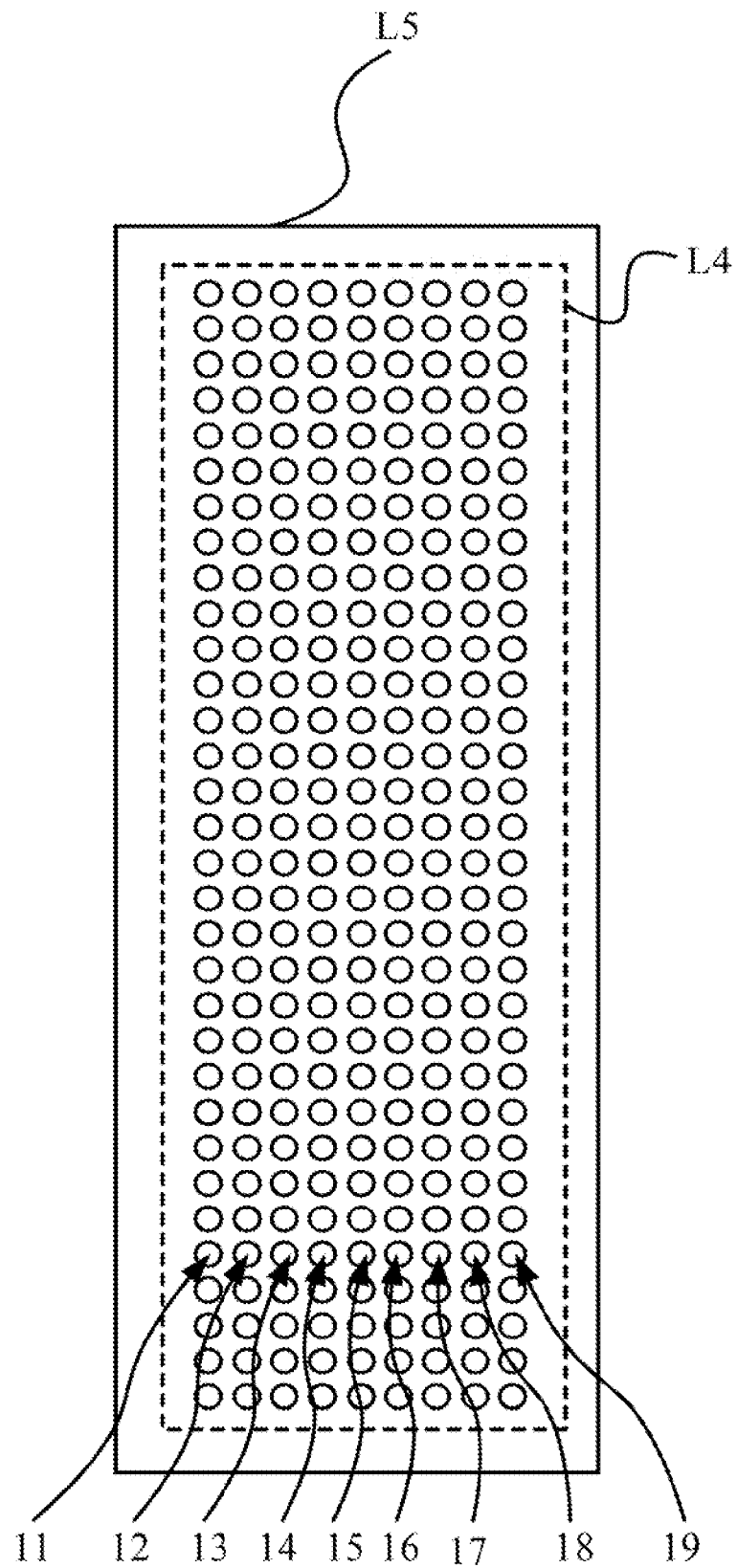

With reference to FIG. 3E, the layer L3 comprises a dielectric layer, such as another layer of printed circuit board, on which an array of windows are formed and aligned with the windows on the layer L2. In FIG. 3F, lamps in the layer L4 are formed as lamp arrays on the upper surface of the layer L5 and aligned with the windows on the layer L3. The lamps on the layer L5 may comprise LEDs or OLEDs. Buses connecting the lamps are also formed on the layer L5. Distance between any two of the detection pads exceeds the thickness of the layer L1. The layers L2 and L5 may comprise printed circuit boards.

Figure 3G:
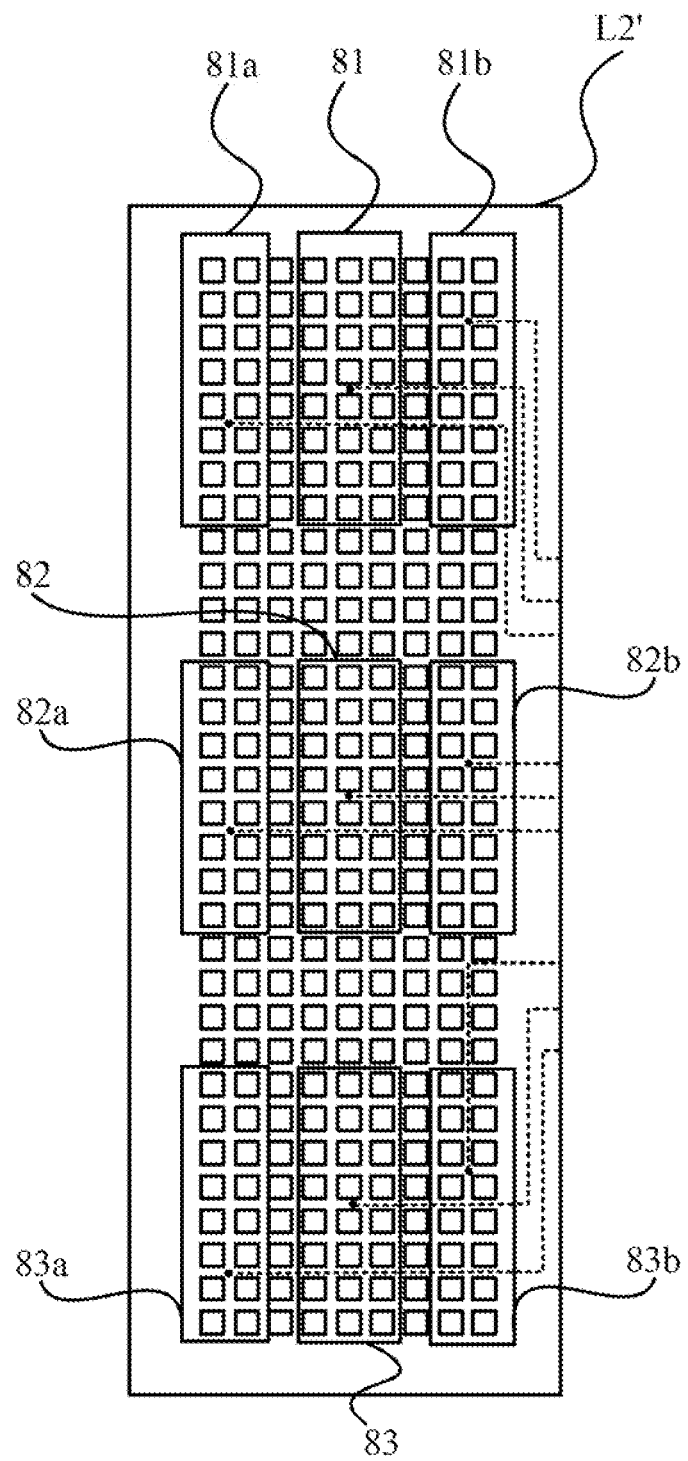
FIG. 3G is an alternative embodiment of the second layer of the physical control module.

Note that more detection pads may be formed on the layer L2. An operating point of the control 60 may associate with a group of detection pads. For example, FIG. 3G shows another embodiment of the layer L2 wherein components such as vias and traces are represented analogously with respect to FIG. 3C. An operating point of the control 60 is associated with three detection pads, in which a central detection pad (such as 81) and a left detection pad (such as 81a) and a right detection pad (such as 81b) thereof are connected to the controller 165 through corresponding vias and traces. As more than one detection pad are grouped up to correspond to a single operating point on the control 60, the controller 165 may detect moving direction of a contact operation on an operating point by determining the order of detection pad activation in a detection pad group.

2. GUI Control Method

The electronic reader device 100 may provide a plurality of functions and display icons respectively corresponding to the plurality of functions.

2.1 Icon Behavior

Status of an icon may notify events received or generated by the program associated with the icon. The processor 151 may update icon status shown by the lamps of the control 60 to synchronize with program events or status associated with the icon when the display 155 shows another foreground program or is turned off.

Status of an icon may comprise at least three states, such as on, off, and animation states. The on state of an icon may comprise a plurality of sub-states respectively representing statuses of the program functions associated with the icon. For example, the sub-states may represent function execution/suspension, service signing in/off, communication channel connection/disconnection, and others. The off icon state indicates that the device 100 is in suspension mode. The animation state of an icon indicates message delivery from a function or program associated with the icon.

With reference to FIG. 2, icons 41-45 respectively correspond to functions of returning to a main page, showing a favorite collection folder (typically referred to as "My Favorite"), launching a music player program, a really simple syndication (RSS) reader, and an Internet messaging application. Icons 431-435 respectively correspond to optional functions of the music player program associated with the icon 43. The icon 431 corresponds to resumption or suspension of music playback. The icons 432 and 433 respectively correspond to backward and forward playback switching. The icon 434 corresponds to showing a GUI of information query. The icon 435 corresponds to showing a GUI of music player configurations. When detecting a touch condition to activate an icon shown in FIG. 2, the processor 155 performs a function corresponding to the activated icon.

With reference to FIG. 4, areas 51-53 on the control 60 are respectively in proximity to the detection pads 81-83. Each of the areas 51-53 serves as an operating point of the control 60 which when activated triggers the electronic reader device 100 to perform one or more functions associated with the operating point. Upon detecting contact, the controller 165 may interpret the contact operation on one operating point as activation operation of the operating point. As each of the areas 51-53 may initially be associated with no function, lamps in the areas 51-53 may correspondingly be initially off and showing any iconic image.

2.2 Exemplary Operation

Figure 5:
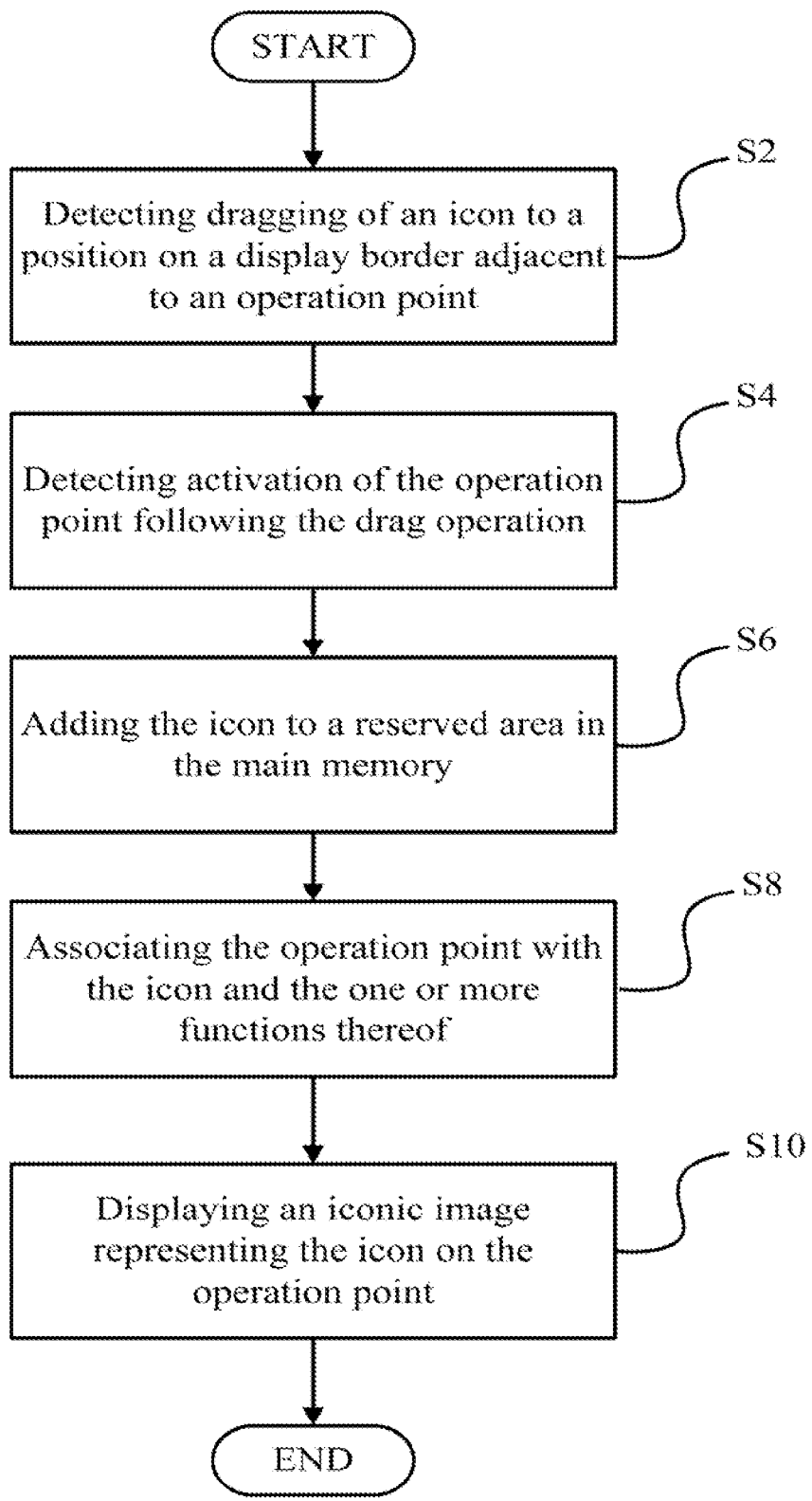
FIG. 5 is a flowchart of an exemplary embodiment of a graphical user interface (GUI) control method.
Figure 6:
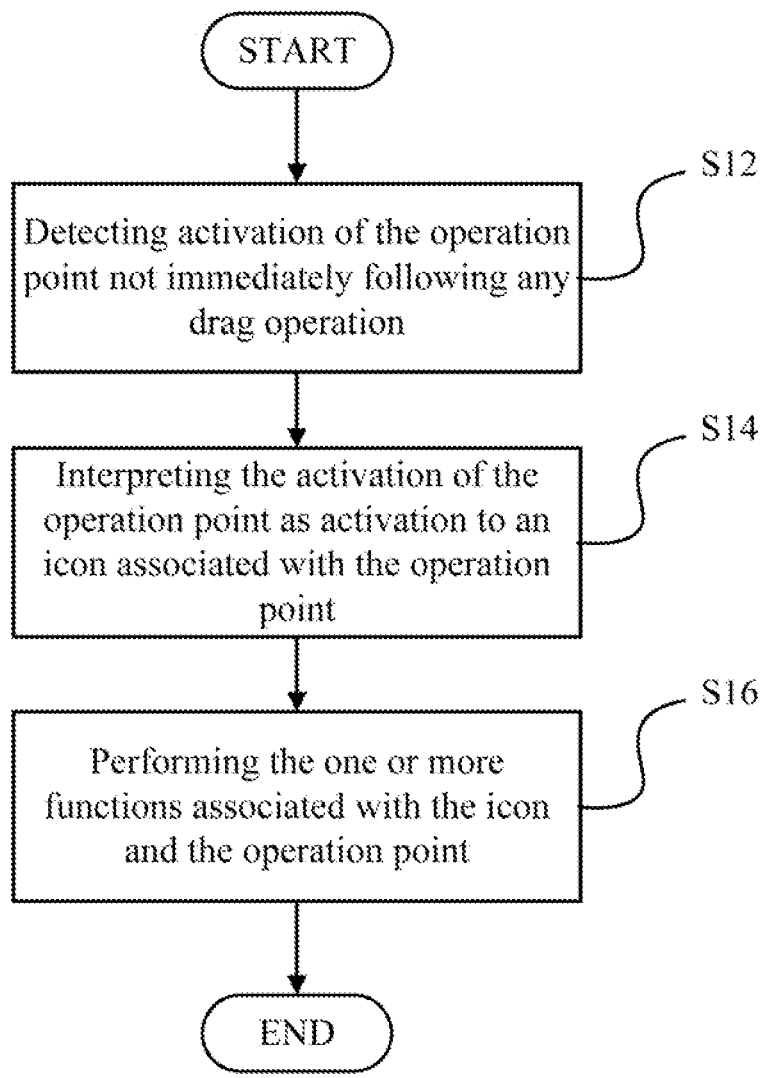
FIG. 6 is a flowchart of an exemplary embodiment of operating point activation of the physical control module.

With reference to FIG. 5, the processor 151 detects two events comprising a drag operation that moves an icon to a position on a border of the display 155 close to an operating point of the physical control 60 (step S2) and an activation of the operating point of the physical control 60 immediately following the drag operation (step S4). The drag operation may begin from an original position of the icon to a point in a close proximity region to one of the operating points, such as one of the areas 51-53, thus to generate the detected events in steps S2 and S4. The processor 151 adds the icon to a reserved area in the main memory 152 (step S6), associates the icon and one or more functions corresponding to the icon with the operating point (step S8) and switches on a portion of lamps in the area of the operating point to show an iconic image representing the icon on the operating point in response to steps S2 and S4 (step S10). If the operating point has an original association with a default function of a default icon before step S2, the processor 151 replaces the original association of the operating point and the default function by the association generated in step S8. The processor 151 may represent the association by data stored in the main memory 152 or the nonvolatile memory 153. The processor 151 may determine that the activation of the operating point immediately follows the drag operation if occurrence of the operating point activation in step S4 is no later than a predetermined period D from the time when an end point of the drag operation on the display 155 is detected in step S2. The processor 151 presents the iconic image as a copy of the icon, and may not remove the icon from the display 155 after the drag operation. With reference to FIG. 6, when receiving activation of the operating point (step S12), the processor 151 interprets the activation of the operating point as an activation to an icon associated with the operating point (step S14) and performs the one or more functions currently associated with the icon and the operating point (step S16). Note that in step S12, the activation of the operating point does not immediately follow any special drag operation. The processor 151 updates the iconic image on the activated operating point to synchronize the appearance of the image with the icon associated with the operating point.

The processor 151 may determine the drag operation of the icon as a special drag operation if the end point of the drag operation on the display border is in a close proximity region to or close to an operating point. The processor 151 may execute steps S6, S8, and S10 in response to the special drag operation.

Figure 7:
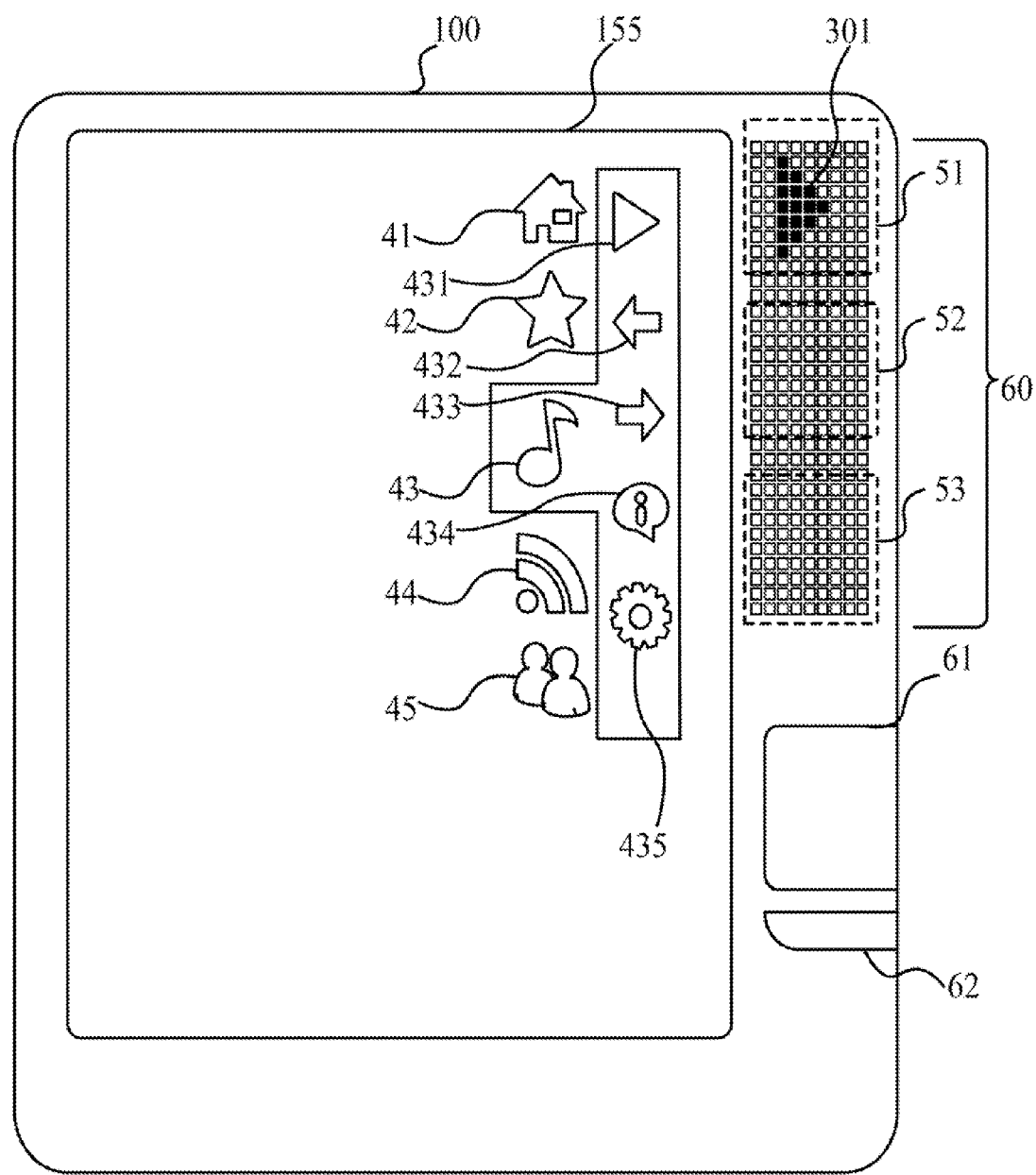
FIGS. 7-9 are schematic diagrams of exemplary embodiments of the electronic reader device with different icons shown on the physical control module.
Figure 8:
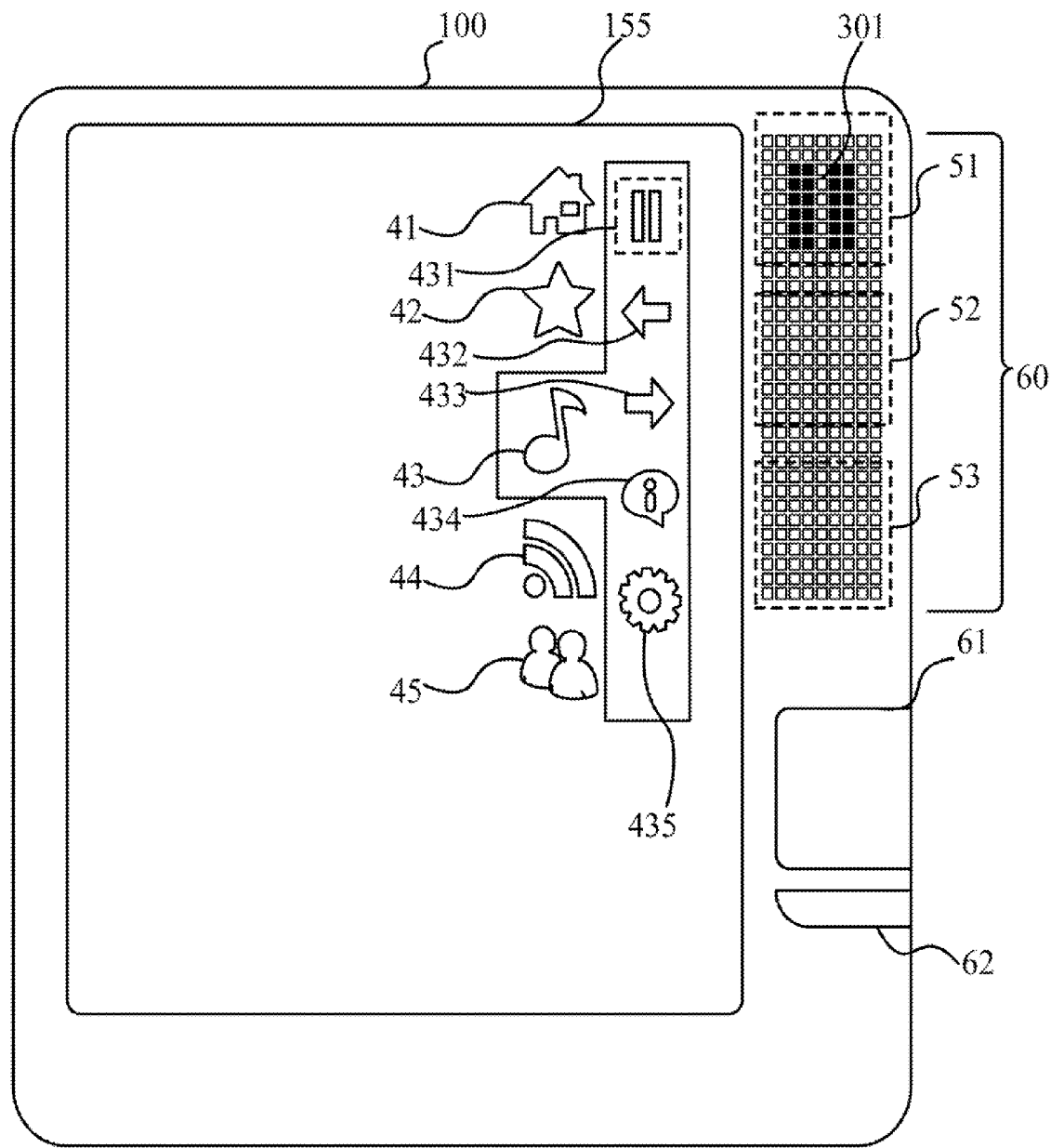

With reference to FIG. 4, for example, when detecting a first drag operation 201 that moves the icon 431 to a position P1 on a border of the display 155 close to the operating point of the area 51 (step S2) and an activation of the operating point of the area 51 following the first drag operation (step S4), the processor 151 adds the icon 431 to a reserved area in the main memory 152 (step S6), associates music playback resumption and suspension functions of the icon 431 with the operating point of the area 51 to establish a first association thereof (step S8) and switches on a portion of lamps in the area 51 to show an iconic image 301 representing the icon 431 in response to the detection (step S10), as shown in FIG. 7. When receiving activation of the operating point of the area 51 (step S12), the processor 151 according to the first association interprets the activation of the operating point as an activation to the icon 431 associated with the operating point (step S14) and performs the music playback resumption function associated with the operating point (step S16). The icon 431 may change appearance according to the performed one or more functions. The processor 151 may control the lamps in the area 51 to synchronize appearance of the iconic image 301 with the icon 431. As shown in FIG. 8, for example, after step S14, appearances of the icon 431 and the image in the area 51 synchronously change to represent the suspension function.

Data representing association of an operating point, an icon, and one or more functions thereof, such as the operating point of the area 51, the icon 431, and music playback resumption and suspension functions of the icon 431, may comprise identification information of each of the associated operating point, icon, and one or more functions in the association.

Additionally, the processor 151 may smoothly display movement of the icon 431 along a track of the drag operation 201 in step S2, and when the drag operation reaches the position P1, keeps on movement of the icon 431 according to the moving speed and direction of the icon 431 on the position P1 for the predetermined period D.

Figure 9:
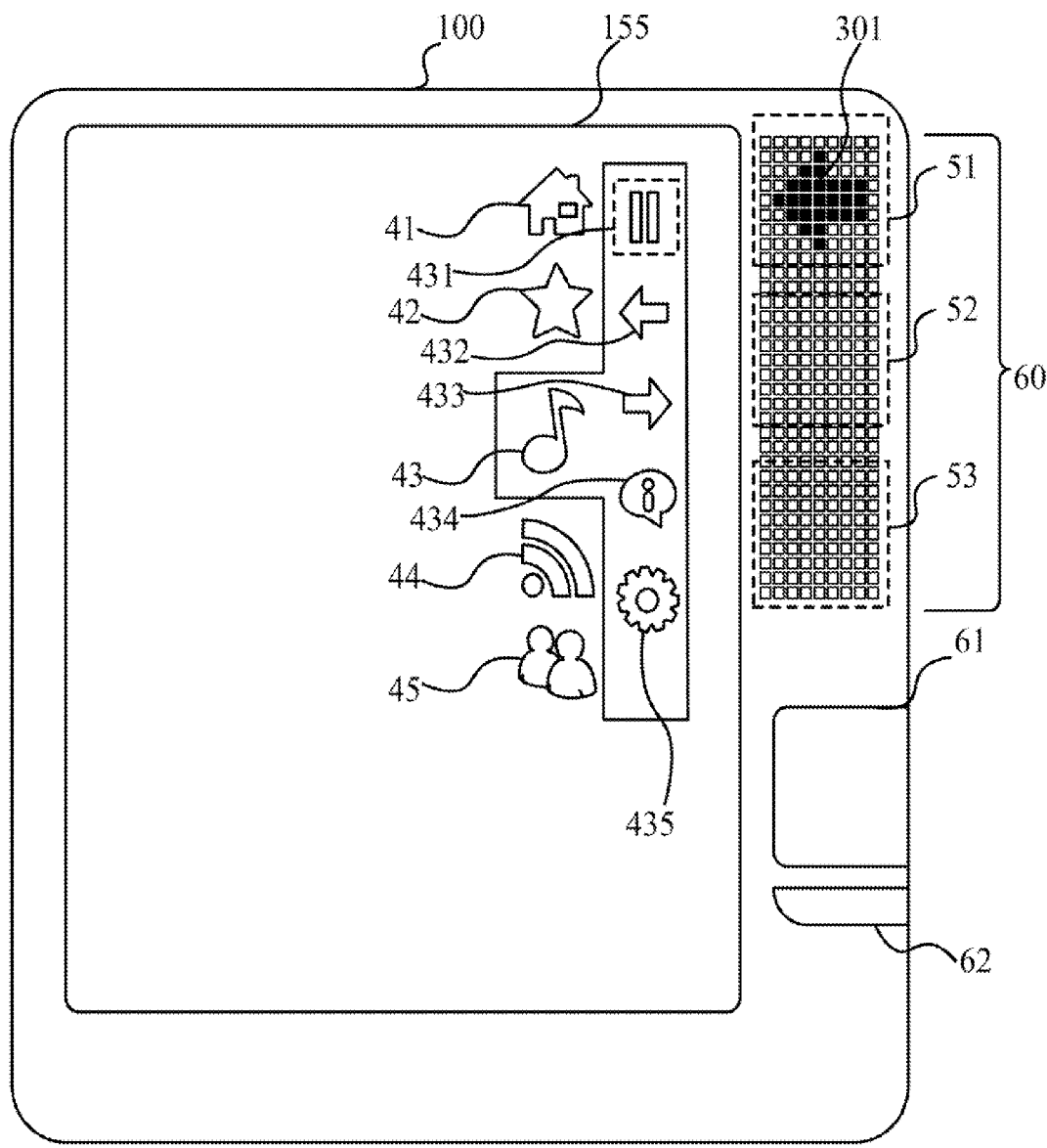

Further, when detecting a second drag operation 202 that moves the icon 432 to a position P2 on a border of the display 155 adjacent to the operating point of the area 51 (step S2) and an activation of the operating point of the area 51 following the second drag operation (step S4), the processor 151 adds the icon 432 to a reserved area in the main memory 152 (step S6), associates backward music playback switch function of the icon 432 with the operating point of the area 51 to establish a second association of thereof (step S8) and switches on a portion of lamps in the area 51 to show an iconic image 302 (shown in FIG. 9) representing the icon 432 rather than performing the music playback suspension function (step S10). The processor 151 replaces the first association between the operating point 51 and the icon 431 by the second association between the operating point 51 and the icon 432. When receiving activation of the operating point of the area 51 (step S12), the processor 151 interprets the activation of the operating point as an activation to the icon 432 associated with the operating point of the area 51 (step S14) and performs the backward music playback switch function associated with the operating point according to the second association (step S16).

3. Alternative Embodiments 3.1 Alternative Configuration of Touch Sensors

Light guide components, such as optical fibers, may be respectively utilized to connect each lamp to a corresponding window on a detection pad, thus to eliminate interference between the lamps and the detection pads. The dimension of each window on the control 60 may as small as a cross-section area of an optical fiber. Alternatively, as one end of an optical fiber is connected to a window on the control 60, the other end of an optical fiber may be connected to one or more pixel of the display 155. Thus, an area of the display 155 comprising the fiber-connected pixels is reserved for the functions of the physical control 60.

Figure 10:
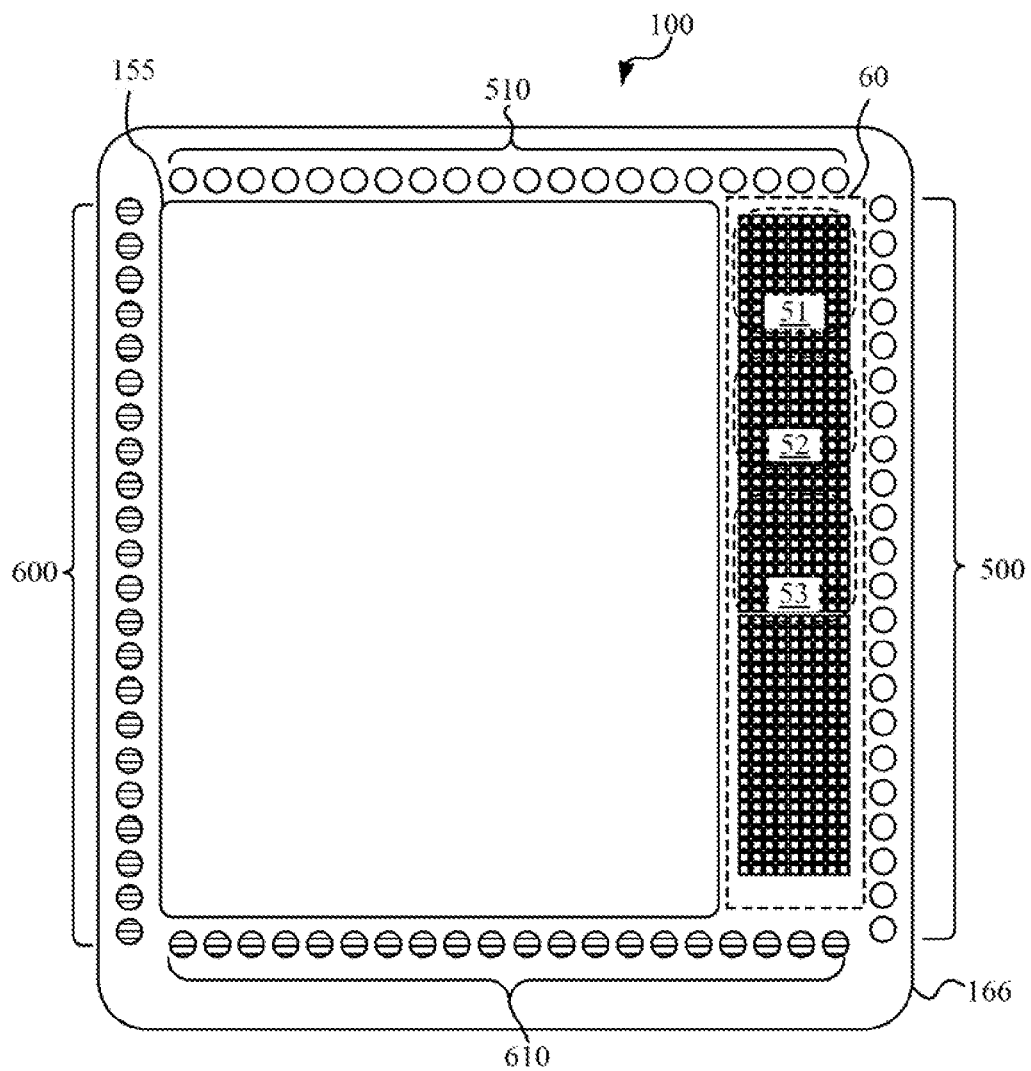
FIG. 10 is a schematic diagram of an alternative embodiment of the electronic reader device with light-based touch sensors.

With reference to FIG. 10, infra-red LEDs and photodiode (PD) receivers disclosed in US patent publication No. 20090189878 may be utilized by the device 100. Infra-red LEDs are represented by similar circles with stripes, and PD receivers are represented by similar circles without stripes. Infra-red LEDs 600 are arranged as a vertical array adjacent to left edge of the display 155, and PD receivers 500 operable to receive light beams transmitted by the LEDs 600 are arranged as a vertical array adjacent to right edge of the control 60. Infra-red LEDs 610 are arranged as a horizontal array adjacent to lower edge of the display 155 and the control 160, and PD receivers 510 operable to receive light beams transmitted by the LEDs 610 are arranged as a horizontal array adjacent to upper edge of the display 155 and the control 160. The processor 151 may utilize the LEDs 600, 610 and PD receivers 500, and 510 to detect contact operations in an area enclosed by these LEDs and PD receivers. The infra-red LEDs and PD receivers may be fixed to an inner surface of the shell 166.

Figure 11:
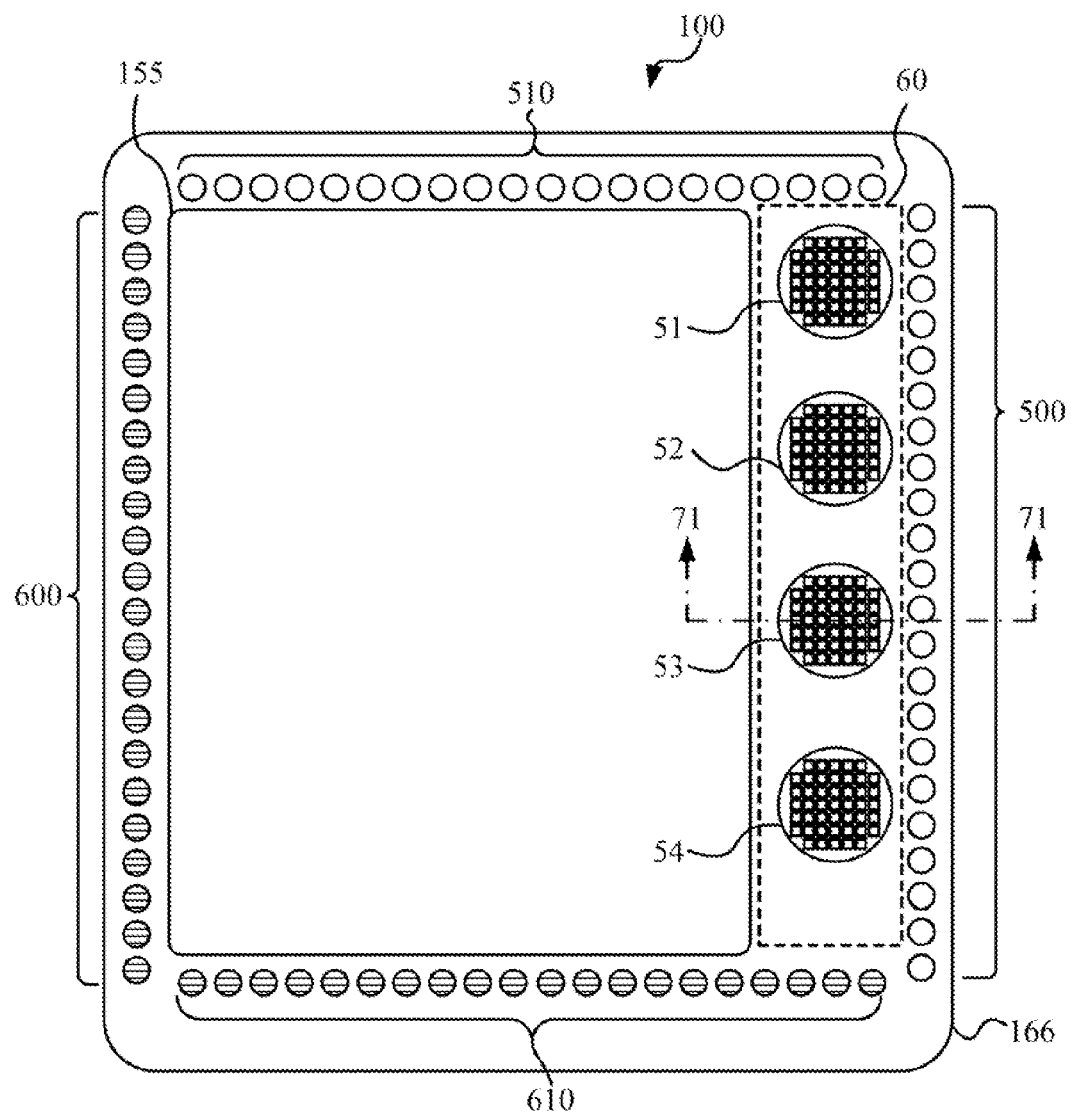
FIG. 11 is a schematic diagram of an alternative embodiment of the electronic reader device with physical controls structured as keys.
Figure 12:
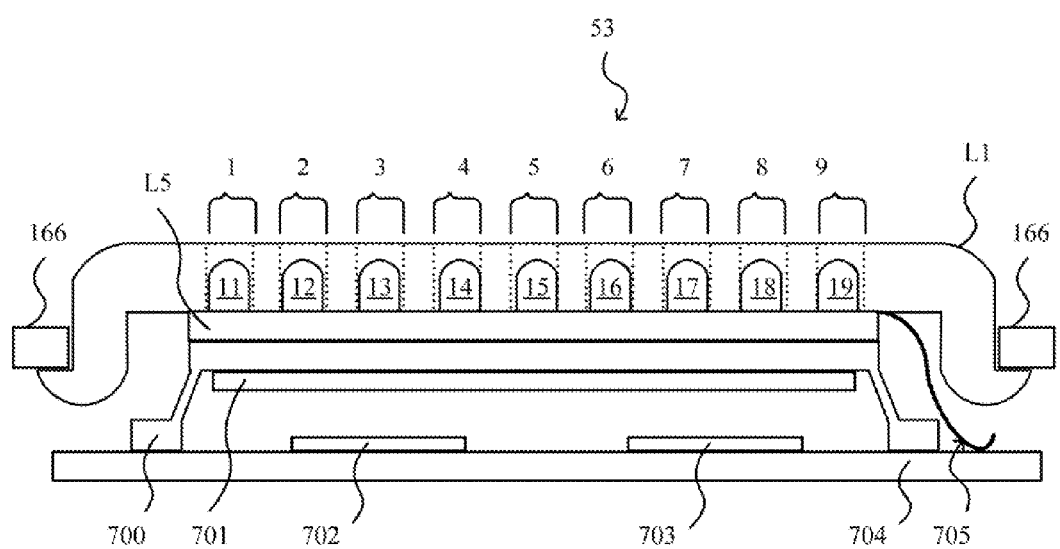
FIG. 12 is a cross-section of a key in one alternative embodiment of the physical control.

With reference to FIG. 11, the operating points of the control 60 may be structured as keys in areas 51-54. Each of the operating points is activated by contact. FIG. 12 shows a cross-section of a key in the area 53 along a line 71. Similar or identical components between FIGS. 12 and 3A are labeled with the same numbers. A top cover L1 of the key comprises a plurality of transparent windows including 1-9 through which lamps including 11-19 may provide illumination. The lamps including 11-19 of the key are formed on PCB L5 and connected to the controller 165 through a flexible bus 705. The bus 705 may comprise a flexible printed circuit board. A cushion 700 of the key is made up of elastic material, on which a pad 701 is made up of electrically conductive material. Labels 702 and 703 denote two terminals of wires printed on PCB 704. The pad 701 may connect the terminals 702 and 703 when the key is depressed. The processor 151 may detect if the key is depressed by determining if the terminals 702 and 703 are connected.

3.2 Additional Contact Operations

The iconic images shown on the control 60 may also be referred to as icons. The processor 151 may respond to various contact operations on an operating point based on a status of an icon associated with the operating point.

In response to a drag operation applied to an icon in "on" state from an operating point of the control 60 to the functional display 155, the processor 151 removes the association between the operating point and a program of the icon and further disables presentation of the icon on the control 60. Removal of the association between the operating point and the program also cancels association of the operating point, the icon, and operations of the program. In response to a contact operation applied to an icon in "on" state, the processor 151 executes a function represented by the icon. In response to a depress and hold operation applied to the icon in "on" status, the processor 151 brings the program associated with the icon to the foreground of the display 155. The depress and hold operation comprises contact with the operating point associated with the icon for a predetermined period of time.

In a suspension mode of the device 100, the processor 151 may enter a power saving state while the control 60 and at least a related IC thereof (such as the controller 165) still works in a normal operation mode. In response to a contact operation on any icon in off state, the IC related to the control 60 interrupts the processor 151, and the processor 151 changes operation mode of the device 100 and restores all icons on the control 60 to "on" or "animation" state.

In response to event or message notification from a program, the processor 151 changes status of an icon displayed on an operating point of the control 60 associated with the program from an original state to an animation state. In response to a contact operation applied to an icon in "animation" state on the control 60, the processor 151 prompts a GUI element showing a message of a program associated with the icon.

In response to a drag operation applied to an icon in "animation" state from the control 60 to the display 155, the processor 151 brings the program associated with the icon to the foreground of the display 155 for further operations.

In response to a drag operation applied to an icon in "animation" status from the control 60 to the border thereof, the processor 151 cancels message notification from the program associated with the icon and restores status of the icon to an original status thereof.

4. Conclusion

As previously described, the electronic reader device 100 allows transition of icons between display 155 and a physical control forming a portion of the frame of the display 155. Each operating point of the physical control may serve as a functional key and is configurable to trigger various functions. The physical control has no printed icon, thus providing more user-definable features.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic device with a proximity sensing button, comprising:
   a mechanical push key comprising a push button switch, a first detection pad, and a upper layer structure located on the first detection pad,
   wherein the push button switch comprises two disconnected electrical terminals, and is operable to electrically connect the two disconnected electrical terminals in response to activation of the push button switch, and
   the first detection pad comprises a metal pad formed on a printed circuit board located on the push button switch; and
   a controller electrically connected to the first detection pad through a bus, and operable to detect a first touch operation in a first proximity region of the first detection pad by detecting capacitance changes of the metal area, wherein a upper surface of the upper cover structure is structured to receive the first touch operation;
   wherein the push button switch comprises a space for operation of the push button switch between the first detection pad and the two electrical terminals, and a distance from the upper cover structure to the two electrical terminals exceeds thickness of the upper cover structure;
   wherein an upper surface of the upper cover structure is structured to receive the first touch operation, a lower surface of the upper cover structure is structured to assemble with the first detection pad such that the thickness of the upper cover structure substantially defines a distance from the first detection pad to the upper surface of the upper cover structure.

2. The electronic device as claimed in claim 1, wherein the push button switch further comprises a cushion made up of elastic materials, and a conductive pad made up of electrically conductive material is located on the cushion and is operable to electrically connect the two disconnected electrical terminals in response to depression of the mechanical push key.

3. The electronic device as claimed in claim 1, wherein a planar area of the first proximity region of the first detection pad exceeds an icon display area on the upper cover structure associated with the first detection pad, and the icon display area is structured to allow displaying of a hotkey icon associated with the first detection pad.

4. The electronic device as claimed in claim 1, wherein the mechanical push key further comprises:
   a second detection pad comprising a metal pad formed on the printed circuit board located under the upper layer structure over the push button switch and besides the first detection pad, wherein the controller detects a second touch operation in a second proximity region of the second detection pad;
   wherein the controller is electrically connected to the first detection pad and the second detection pad through the bus, and operable to detect a direction of the first touch operation and the second touch operation based on an order in which the first detection pad and the second detection pad detect the first touch operation and the second touch operation, respectively.

5. The electronic device as claimed in claim 4, wherein the second detection pad is most adjacent to the first detection pad, and a distance between the first detection pad and the second detection pad exceeds a thickness of the upper cover structure.

6. The electronic device as claimed in claim 1, wherein the upper cover structure comprises a two-dimensional array of windows filled with transparent dielectric materials, the first detection pad comprises a two-dimensional array of openings, the windows are aligned with the openings, and each of the windows is connected to one of a plurality of pixels of an icon presenting display of the electronic device respectively through a light guide component;
   wherein a two-dimensional array of the pixels of the icon presenting display is located to face a first side of the first detection pad,
   the two-dimensional array of windows is located above a second side of the first detection pad opposing the first side, and
   the icon presenting display utilizes the two-dimensional array of the pixels to show an icon through the two-dimensional array of openings of the first detection pad.

7. The electronic device as claimed in claim 6, wherein a distance from the upper cover structure to the icon presenting display exceeds thickness of the upper cover structure.

8. An electronic reader device with a proximity sensing button, comprising:
   a housing;
   a physical control located on a surface of the housing and operable to initiate a first function in response to activation of the physical control, and comprises an array of mechanical push keys with a plurality of detection pads, wherein each of the mechanical push keys comprises a push button switch, a detection pad among the plurality of detection pads, and a upper layer structure located on the detection pad, wherein the push button switch comprises two disconnected electrical terminals, and is operable to electrically connect the two disconnected electrical terminals in response to activation of the push button switch, and the detection pad comprises a metal area formed on a printed circuit board located on the push button switch; and
   a controller electrically connected to the first detection pad through a bus, and operable to detect a first touch operation in a first proximity region of a first detection pad among the plurality of detection pads, wherein an upper surface of the upper cover structure is structured to receive the first touch operation;
   wherein the push button switch comprises a space for operation of the push button switch between the first detection pad and the two electrical terminals, and a distance from the upper cover structure to the two electrical terminals exceeds thickness of the upper cover structure;
   wherein an upper surface of the upper cover structure is structured to receive the first touch operation, a lower surface of the upper cover structure is structured to assemble with the first detection pad such that the thickness of the upper cover structure substantially defines a distance from the first detection pad to the upper surface of the upper cover structure.

9. The electronic device as claimed in claim 8, wherein the push button switch further comprises a cushion made up of elastic materials, and a conductive pad made up of electrically conductive material is located on the cushion and is operable to electrically connect the two disconnected electrical terminals in response to depression of the mechanical push key.

10. The electronic device as claimed in claim 8, wherein a planar area of the first proximity region of the first detection pad exceeds an icon display area on the upper cover structure associated with the first detection pad, and the icon display area is structured to allow displaying of a hotkey icon associated with the first detection pad.

11. The electronic device as claimed in claim 8, wherein each of the mechanical push keys further comprises:
a second detection pad comprising a metal pad formed on the printed circuit board located under the upper layer structure over the push button switch and besides the first detection pad, operable to detect a second touch operation in a second proximity region of the second detection pad;
wherein the controller is electrically connected to the first detection pad and the second detection pad through the bus, and operable to detect a direction of the first touch operation and the second touch operation based on an order in which the first detection pad and the second detection pad detect the first touch operation and the second touch operation, respectively.

12. The electronic device as claimed in claim 11, wherein the second detection pad is most adjacent to the first detection pad, and a distance between the first detection pad and the second detection pad exceeds a thickness of the upper cover structure.

13. The electronic device as claimed in claim 8, wherein the upper cover structure comprises a two-dimensional array of windows filled with transparent dielectric materials, the first detection pad comprises a two-dimensional array of openings, the windows are aligned with the openings, and each of the windows is connected to one of a plurality of pixels of an icon presenting display of the electronic device respectively through a light guide component;
wherein a two-dimensional array of the pixels of the icon presenting display is located to face a first side of the first detection pad,
the two-dimensional array of windows is located above a second side of the first detection pad opposing the first side, and
the icon presenting display utilizes the two-dimensional array of the pixels to show an icon through the two-dimensional array of openings of the first detection pad.

14. The electronic device as claimed in claim 13, wherein each of the plurality of pixels comprises a pixel on a primary display of the electronic device, and the physical control is formed on an edge of a frame structured to enclose the primary display.

15. The electronic device as claimed in claim 13, wherein a distance from the upper cover structure to the icon presenting display exceeds thickness of the upper cover structure.

16. The electronic device as claimed in claim 8, wherein the metal area comprises a two-dimensional array of openings, the physical control is formed on an edge of a frame structured to enclose a primary display of the electronic device, and a secondary display of the electronic device shows a hotkey icon through the openings of the metal area.

17. The electronic device as claimed in claim 16, further comprises a processor operable to show the hotkey icon on the secondary display as a copy of an original icon on the primary display in response to an assigning drag operation carrying the copy of the original icon from the primary display to the first proximity region, and synchronize a state of the hotkey icon with the original icon, wherein each of the hotkey icon and the original icon comprises a plurality of states.

18. The electronic device as claimed in claim 17, wherein the processor shows an alternative icon on the secondary display to replace the hotkey icon in response to a replacing drag operation carrying a copy of the alternative icon from the primary display to the first proximity region, a planar area of the first proximity region exceeds a display area operable to show the hotkey icon, and the replacing drag operation is a separated drag operation separated from the hotkey icon, and the separated drag operation ends in the first proximity region before reaching the display area operable to show the hotkey icon.

19. The electronic device as claimed in claim 18, wherein the processor keeps displaying movement of the alternative icon for a predetermined period of time upon the end of the separated drag.

20. An electronic device with a proximity sensing button, comprising:
a housing;
a physical control located on a surface of the housing and operable to initiate a first function in response to activation of the physical control, and comprises:
a first printed circuit board comprising two disconnected electrical terminals;
a mechanical push key comprising a push button switch and a proximity sensing unit, wherein the push button switch is located on the first printed circuit board, and is operable to electrically connect the two disconnected electrical terminals in response to activation of the push button switch, and
the proximity sensing unit is located on the push button switch, and is operable to detect a touch operation on the proximity sensing unit, wherein the proximity sensing unit comprises a second printed circuit board and a metal area formed on the second printed circuit board; and
a controller electrically connected to the proximity sensing unit through a bus, and the controller is operable to detect the touch operation in a proximity region of the metal area by detecting capacitance changes of the metal area;
wherein the metal area comprises:
a first detection pad which is a metal pad formed on the second printed circuit board, wherein the controller detects a first touch operation in a first proximity region of the first detection pad;
wherein the proximity sensing unit further comprises an upper cover structure located on the first detection pad, and the upper cover structure comprises dielectric material;
wherein the controller is electrically connected to the first detection pad through the bus, and operable to detect the first touch operation through the first detection pad;
wherein the push button switch comprises a first space for operation of the push button switch between the first detection pad and the two electrical terminals, and a distance from the upper cover structure to the two electrical terminals exceeds thickness of the upper cover structure;
wherein an upper surface of the upper cover structure is structured to receive the first touch operation, a lower surface of the upper cover structure is structured to assemble with the first detection pad such that the thickness of the upper cover structure substantially defines a distance from the first detection pad to the upper surface of the upper cover structure.

21. The electronic device as claimed in claim 20, wherein the electronic device comprises a touch sensitive module comprising:
one or more infrared light emitting diodes operable to transmit light; and
one or more infrared light receiver operable to receive the light transmitted by the one or more infrared light emitting diodes.

22. The electronic device as claimed in claim 20, wherein the push button switch further comprises a cushion made up of elastic materials, and a conductive pad made up of electrically conductive material is located on the cushion and is operable to electrically connect the two disconnected electrical terminals in response to depression of the mechanical push key.

23. The electronic device as claimed in claim 20, wherein the metal area forms to provide
the first proximity region of the first detection pad enclosing an icon display area on the upper surface of the upper cover structure.

24. The electronic device as claimed in claim 23, wherein a planar area of the proximity region of the metal area exceeds an icon display area on the upper cover structure associated with the metal area, wherein the icon display area is structured to allow displaying of a hotkey icon associated with the metal area.

25. The electronic device as claimed in claim 23, further comprises an array of mechanical push keys, each of the mechanical push keys comprises:
a second push button switch; and
a second detection pad comprising a metal pad located on the second push button switch, and operable to detect touch operations on the second detection pad.

26. The electronic device as claimed in claim 23, wherein the proximity sensing unit comprises:
a second detection pad comprising a metal pad formed on the second printed circuit board located under the upper cover structure over the push button switch and besides the first detection pad,
wherein the controller detects a second touch operation in a second proximity region of the second detection pad;
wherein the controller is electrically connected to the first detection pad and the second detection pad through the bus, and operable to detect a direction of the first touch operation and the second touch operation based on an order in which the first detection pad and the second detection pad detect the first touch operation and the second touch operation, respectively.

27. The electronic device as claimed in claim 26, wherein the second detection pad is most adjacent to the first detection pad, and a distance between the first detection pad and the second detection pad exceeds a thickness of the upper cover structure.

28. The electronic device as claimed in claim 23, wherein the upper cover structure comprises a two-dimensional array of windows filled with transparent dielectric materials, the first detection pad comprises a two-dimensional array of openings, the windows are aligned with the openings, and each of the windows is connected to one of a plurality of pixels of an icon presenting display of the electronic device respectively through a light guide component;
wherein a two-dimensional array of the pixels of the icon presenting display is located to face a first side of the first detection pad,
the two-dimensional array of windows is located above a second side of the first detection pad opposing the first side, and
the icon presenting display utilizes the two-dimensional array of the pixels to show an icon through the two-dimensional array of openings of the first detection pad.

29. The electronic device as claimed in claim 28, wherein a second space is positioned between the first detection pad and the push button switch.

30. The electronic device as claimed in claim 28, wherein a distance from the upper cover structure to the icon presenting display exceeds thickness of the upper cover structure.

31. The electronic device as claimed in claim 28, wherein each of the plurality of pixels comprises a pixel on a primary display of the electronic device, and the physical control is formed on an edge of a frame structured to enclose the primary display.

32. The electronic device as claimed in claim 20, wherein the metal area comprises a two-dimensional array of openings, the physical control is formed on an edge of a frame structured to enclose a primary display of the electronic device, and a secondary display of the electronic device shows a hotkey icon through the openings of the metal area.

33. The electronic device as claimed in claim 32, further comprising a processor operable to show the hotkey icon on the secondary display as a copy of an original icon on the primary display in response to an assigning drag operation carrying the copy of the original icon from the primary display to the proximity region, and synchronize a state of the hotkey icon with the original icon, wherein each of the hotkey icon and the original icon comprise a plurality of states.

34. The electronic device as claimed in claim 33, wherein the processor shows an alternative icon on the secondary display to replace the hotkey icon in response to a replacing drag operation carrying a copy of the alternative icon from the primary display to the proximity region, a planar area of the proximity region exceeds a display area operable to show the hotkey icon, and the replacing drag operation is a separated drag operation separated from the hotkey icon, and the separated drag operation ends in the proximity region before reaching the display area operable to show the hotkey icon.

35. The electronic device as claimed in claim 34, wherein the processor keeps displaying movement of the alternative icon for a predetermined period of time upon the end of the separated drag.

* * * * *